United States Patent

[11] 3,624,772

| [72] | Inventor | Arnold P. Grunwald<br>Chicago, Ill. |
| --- | --- | --- |
| [21] | Appl. No. | 874,734 |
| [22] | Filed | Nov. 7, 1969 |
| [45] | Patented | Nov. 30, 1971 |
| [73] | Assignee | The United States of America as represented by the United States Atomic Energy Commission |

[54] READING AND WRITING MACHINE USING RAISED PATTERNS
6 Claims, 7 Drawing Figs.

[52] U.S. Cl...................................................... 197/6.1,
35/35 A, 178/17 A, 178/30, 235/61.12, 242/192, 242/200
[51] Int. Cl...................................................... B41j 3/32,
G09b 21/00
[50] Field of Search.............................................. 197/6.1, 19;
35/35; 178/17 A, 30; 235/61.12; 242/192, 200

[56] References Cited
UNITED STATES PATENTS

| 2,521,338 | 9/1950 | Bryce et al..................... | 35/35 A |
| --- | --- | --- | --- |
| 2,453,239 | 11/1948 | Luhn............................. | 235/61.12 X |
| 3,289,327 | 12/1966 | Chevillon..................... | 197/6.1 |
| 3,230,644 | 1/1966 | Irazoqui....................... | 35/35 A |
| 3,260,340 | 7/1966 | Locklar et al................ | 197/20 X |
| 2,891,736 | 6/1959 | Blaes........................... | 242/192 |
| 3,395,247 | 7/1968 | Fieldgate..................... | 35/35 A |

Primary Examiner—Robert E. Pulfrey
Assistant Examiner—R. T. Rader
Attorney—Roland A. Anderson

ABSTRACT: A reading and writing machine which uses raised patterns to convey information includes a reading belt upon which the patterns are formed and a tape which stores the information. The tape is divided into a plurality of different information portions which the machine can selectively read. Provision is made for writing on selected portions of the tape on blank tape. A simple tape drive mechanism is provided which prevents slack in the tape yet does not require a variable speed drive. The reading belt is formed of plastic with bubbles having two stable positions molded therein.

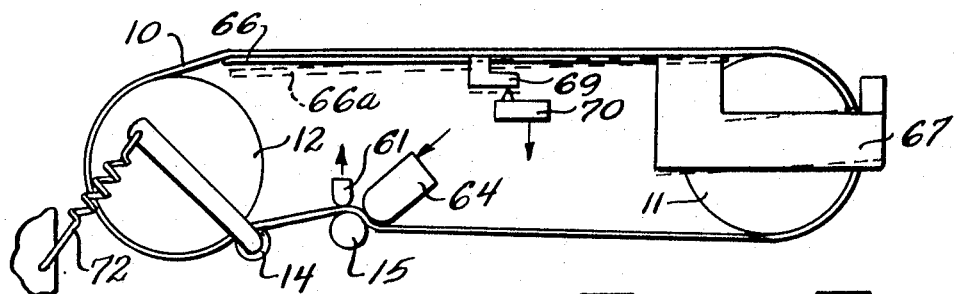
Fig-2
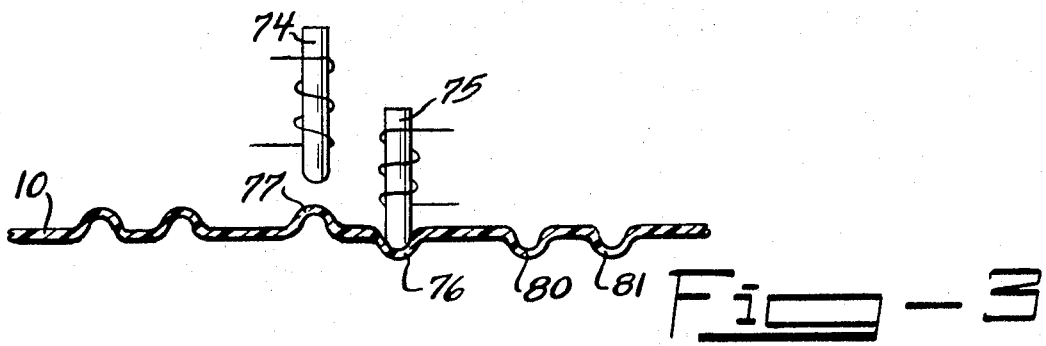
Fig-3
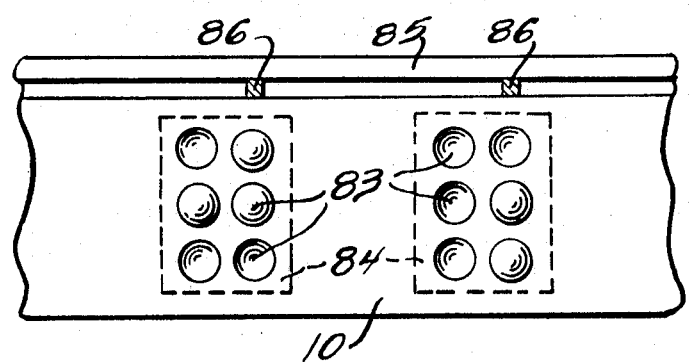
Fig-4
|  | (BLANK) SPACE | ZERO | ONE | BP |
|---|---|---|---|---|
| TRACK A | 0 | 0 | 1 | 1 |
| TRACK B | 0 | 1 | 0 | 1 |
Fig-5
Inventor
Arnold P. Grunwald
Attorney

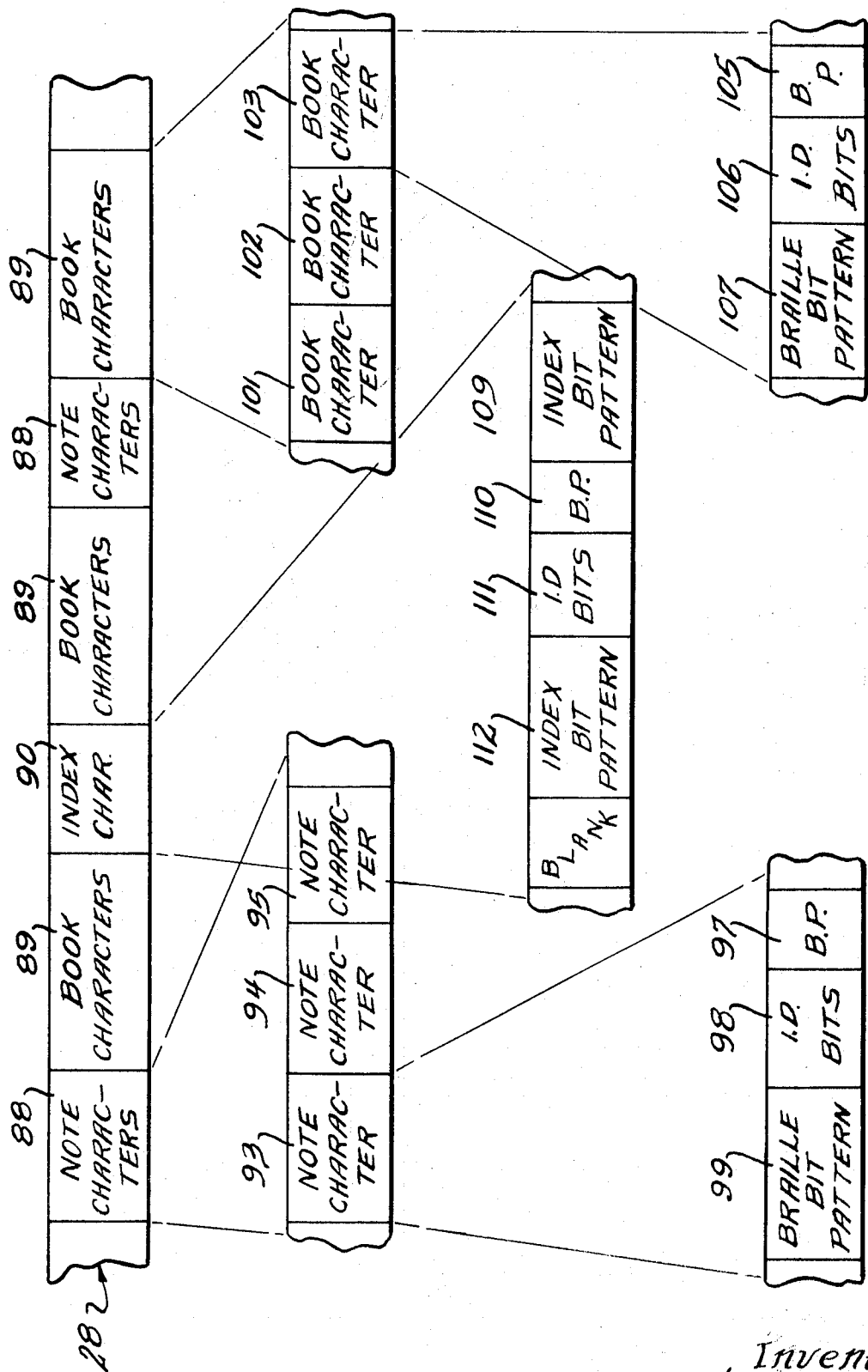

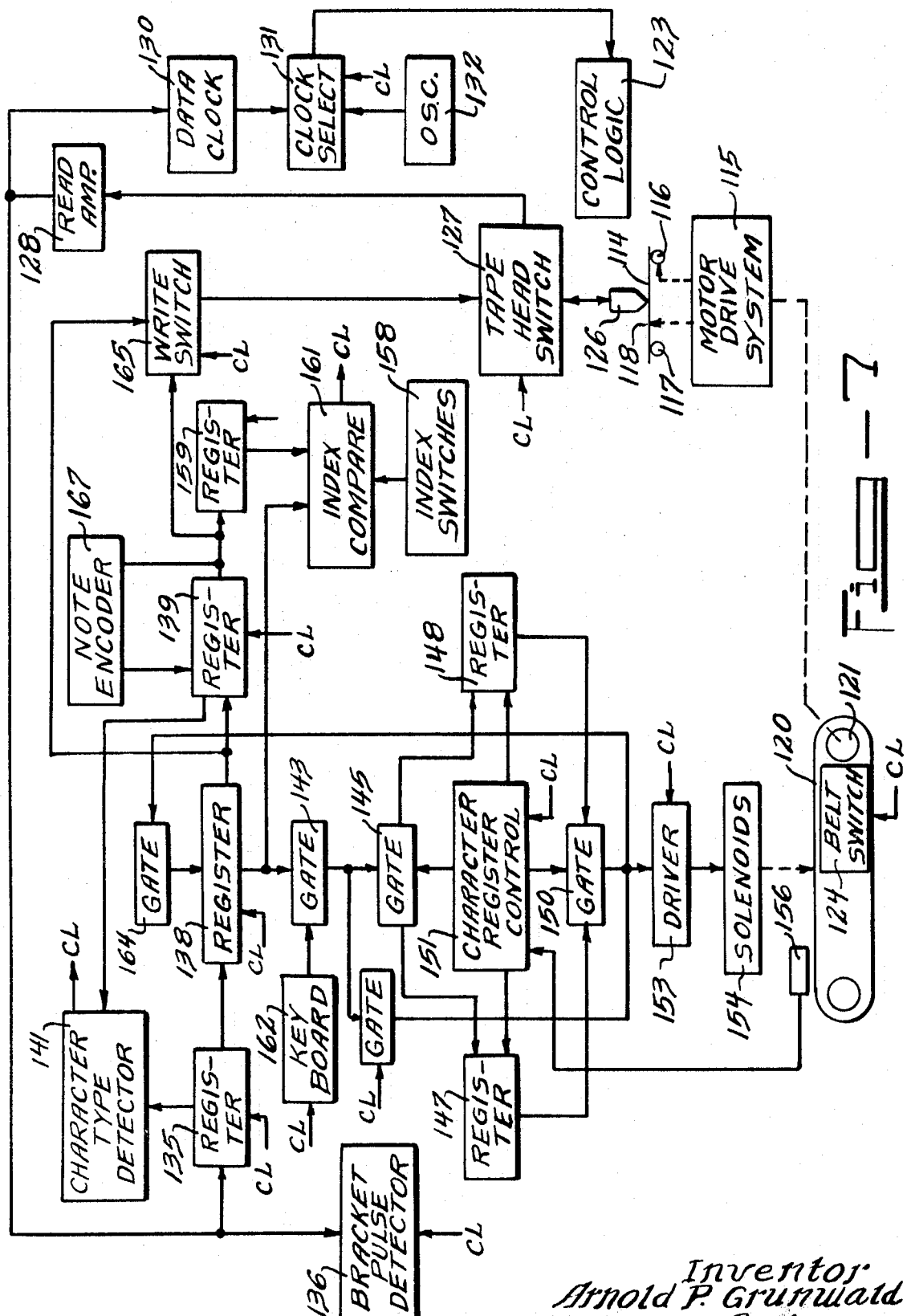

READING AND WRITING MACHINE USING RAISED PATTERNS

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

At present there is a large unbalance between the availability of printed and written material to the sighted and to the blind. The blind have access to recorder material primarily through braille writings and sound recordings. While these two media do not conflict but rather complement each other, the sound recordings have certain disadvantages.

Only a small amount of sound recorded material is generally available; thus sound recordings for the blind must be specially prepared by individuals who read aloud from written material that a blind person wants to study. Access to a particular portion of sound recorded material is not convenient. Furthermore, it is known that peripheral stimulation of senses not directly involved is often advantageous in performing work. This is particularly important for a blind reader, whose connection with the outside world is predominantly auditory. When "reading" is done by ear, the auditory peripheral stimulation becomes confusing rather than helpful.

The braille system of reading uses tactile recognition of raised dots on a page to convey information to the reader who perceives the dot patterns in a manner comparable to a sighted reader's seeing letters. The braille pages are relatively easy to index, so there is good random access to the material. Braille writers have also been developed so that the reader can take notes and prepare material for others to read. Braille has the advantage of being able to be read at a very rapid speed not substantially different from the speed commonly achieved in reading ink print material by sighted people. A further advantage is that the braille material can be read at a desired speed, while recordings must be listened to a predetermined speed. A braille passage can be read and reread as desired, while this is not convenient with a recording.

However, braille has a very large drawback in that the braille material is necessarily very voluminous; its bulk is approximately 50 times that required for corresponding ink print material. Furthermore, braille material must be translated from ink print material because there is not a simple (one to one) correlation between the two. Therefore translation, rather than simple substitution of one character for another, is required. The bulky material, together with the need for translating, causes the braille material to be very costly and it is available only in very limited scope.

Modern printing systems have been developed which use tape for setting the printing type. Computer programs have been developed which will translate the print tape into a braille tape at low cost. However, the extremely large bulk of the braille material and the cost of manufacturing a braille book limit the availability of braille material even if these techniques are used.

Certain machines have been developed which will present braille symbols to the reader in response to a tape input. However, these machines have themselves been relatively bulky, inconvenient to use and expensive. While some of these machines have provided an indexing system, this system is of limited value. In addition there is no provision on these machines for writing, and in particular annotating, the material read.

It is therefore an object of this invention to provide and improved reading and writing machine using raised characters and in which the bulk of the material used to store the desired information is extremely small.

Another object of this invention is to provide a reading and writing machine using raised characters and having a reading speed controllable by the operator.

Another object of this invention is to provide a reading and writing machine using raised characters wherein the cost of the reading material is low.

Another object of this invention is to provide a reading and writing machine using raised characters which does not require the operator to learn a new reading skill.

Another object of this invention is to provide a reading and writing machine using raised characters which gives easy and fast random access to any page, subject volume, etc.

Another object of this invention is to provide a reading and writing machine using raised characters which has a writing feature so that the reader can annotate material or write original material.

Another object of this invention is to provide a reading and writing machine using raised characters which is lightweight, portable, easily operated and has low power consumption so that the operator can use it at any desired location.

SUMMARY OF THE INVENTION

In practicing this invention, a machine is provided having a belt upon which raised characters are formed and a magnetic tape having information stored thereon. The machine "reads" the information stored on the tape and from this information develops the patterns of raised characters on the belt. The tape is capable of storing reading material and is indexed so that any desired portion of the tape can be quickly and automatically found. In addition, a portion of the tape may be reserved so that the machine operator can make notes on the tape. The note-making feature of the machine can also be used by the operator to place information on a blank tape, which can then be used by another operator in a similar machine.

The drive mechanism for the machine provides a fast forward or fast reverse movement as well as an intermittent or stepping tape transport. The tape is driven directly from the periphery of the tape coils wound on supply velocity without the need for complicated variable rotary speed tape-driving mechanisms.

The belt is a plastic material upon which "bubbles" have been formed in a desired pattern. The "bubbles" are bistable in that they can be pushed to one side or the other side of the belt and will remain in either position. In operation, a portion of the machine sets all of the bubbles so that they are on one side of the belt. A solenoid-actuating mechanism selectively pushes desired ones of the bubbles to the other side of the belt to form the raised characters to be read by the machine operator.

BRIEF DESCRIPTION OF THE DRAWINGS

The invention is shown in the drawings, of which:

FIG. 2 is a view of the belt mechanism of the machine;

FIG. 3 is a view of the belt and solenoid actuators;

FIG. 4 illustrates the belt, bubble and magnetic track patterns;

FIG. 5 illustrates the arrangement of information on the magnetic tape;

FIG. 6 shows the code pattern used on the magnetic tape; and

FIG. 7 is a block diagram showing the logic used to control the machine.

DETAILED DESCRIPTION OF THE INVENTION

Figure 1:
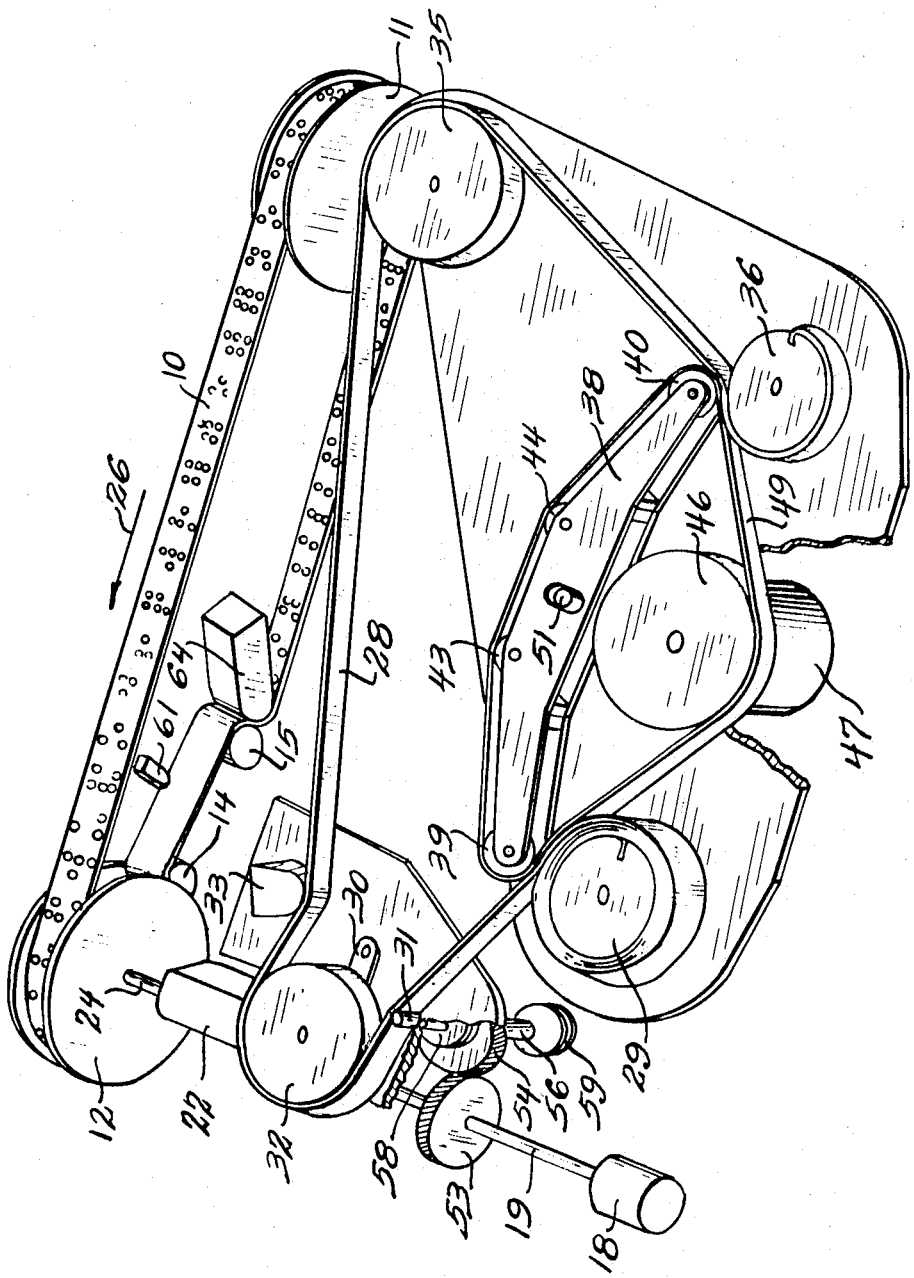
FIG. 1 is a perspective drawing of the machine.

While the machine described can be used with any system using raised patterns to convey information, it will be described as a machine for reading and writing braille.

Referring to FIG. 1, an endless belt 10 is held by wheels 11, 12, 14 and 15. Wheel 12 is driven by motor 18 through shaft 19, variable speed transmission 22 and shaft 24 so that the belt moves in the direction of the arrow 26. The operator places his hands on belt 10 with the raised braille characters thereon moving under his hand, permitting the operator to read the information stored on the magnetic tape. The speed of the belt 10 is controlled by variable speed control 22.

Magnetic tape 28 is stored on a tape supply reel 29 and is threaded around a capstan 31, pinch wheel 32, past tape head 33 and around idler wheel 35 to tape takeup reel 36.

A tape-driving mechanism consists of a idler arm 38 which contains idler wheels 39 and 40 and braking wheels 43 and 44. A drive wheel 46 coupled to drive motor 47 is also provided. A rubber belt 49 extends around drive wheel 46, idler wheel 39, brake wheels 43 and 44 and idler wheel 40. The length of rubber belt 49 is such that it is under tension when it is placed in the position shown. A pivot 51 positions the idler arm 38 and the tension of the rubber belt 48 pulls arm 38 against reels 29 and 36 so that belt 49 hugs the periphery of the magnetic tape on takeup reel 36 and tape supply reel 29.

In operation, motor 47 drives drive wheel 46, moving the rubber belt 49 in a direction so as to unwind the tape from one reel and wind up the tape on the other reel. This direction is reversible to provide fast forward or fast reverse movement of the tape.

Braking wheels 43 and 44 act to provide a drag on the rubber belt 49. Assuming that the tape is on tape supply reel 29 and is being received by takeup reel 36, motor 47 would turn drive wheel 46 in a clockwise direction. Belt 49, frictionally engaged with the periphery of tape 28 on tape supply reel 29, would cause the tape to be unwound from this reel. The friction between belt 49 and the tape on takeup reel 36 will cause takeup reel 36 to wind up the tape. With the tape moving in the direction indicated, the portion of the rubber belt between braking wheels 43 and 44 and drive wheel 46 around idler wheel 40 is stretched while the portion of belt 49 between drive wheel 46 and braking wheels 44 and 43 is relaxed around idler wheel 39. This alternate stretching and relaxation of the belt drive will cause the rubber belt to move takeup reel 36 at a slightly faster rate than is required to receive the tape unwound from supply reel 29. Thus the drive mechanism will automatically adjust to remove any slack from the magnetic tape. If drive wheel 46 is rotated in the opposite direction, that is, counterclockwise, tape is removed from reel 36 and received by reel 29. In this case, the portions of belt 49 which are under tension and which are relaxed are reversed so that reel 29 tends to rotate at a slightly faster rate than reel 36 so that all slack in the magnetic tape will be removed in the reverse operation also.

When tape characters are being read from magnetic tape 28 in other than the indexing mode of operation, pinch wheel 32 is moved by arm 30 against capstan 31 so that tape 28 is controlled by capstan 31. In this mode of operation, motor 47 is nearly stalled and only turns enough to transport the tape pulled by the capstan from one reel and wind it on the other reel. Motor 47 is of a type that will not be damaged when operated in a stalled condition. Power for capstan 31 is provided from motor 18 through helical gears 53 and 54. Helical gear 54 is coupled to shaft 56 through clutch 58. Shaft 56 is coupled to capstan 31 and a brake 59 is coupled to shaft 56 to stop the shaft when required. In operation, the control logic and timing signals from a magnetic track on belt 10 cooperate to intermittently energize and deenergize clutch 58 and brake 59 to provide intermittent tape motion. When clutch 58 is disengaged, brake 59 is energized to stop the movement of the capstan. When clutch 58 is engaged, brake 59 is deenergized to permit capstan rotation.

As tape 28 moves past tape head 33 the information stored on tape 28 is read off and applied to the control logic for use thereby. Information from the control logic is applied to solenoids 64 to set the bubbles on belt 10 in a desired pattern. The timing signals are read from belt 10 by a tape head 61. Variable speed control 22 is set by the operator so that belt 10 will move at a desired speed.

Referring to FIG. 2, there is shown a side view of the belt mechanism. Belt 10 is wound around wheels 11 and 12, 14 and 15 in the manner previously described. The top portion of belt 10, upon which is counterbalanced by counterweight 67 so that it is normally in the raised position shown. When the operator rests his fingers on belt 10, shelf 66 is depressed to position 66a, shown in dashed lines, and remains in this position until the operator removes his hands from the belt. Depressing shelf 66 to position 66a causes bracket 69 to actuate miniature switch 70 to start the operation of the machine. Wheel 14 holds belt 10 under tension under pressure from spring 72. The pressure on belt 10 from wheel 14 against wheel 12 acts to depress all of the raised bubbles to the inside of belt 10, thus presetting belt 10 for the desired pattern formation by solenoids 64.

Referring to FIG. 3, there is shown a section of belt 10. A pair of solenoids 74 and 75 which are used to set the bubbles on the belt in the desired position are also shown. In this example the bubbles to the left of the solenoids are all set in the raised or concave position shown and are stable in this position. (Concave to the person reading the belt.) In the example, solenoid 75 has been operated to depress bubble 76 to a lower or convex position, while bubble 77 remains unchanged as solenoid 74 is not operated. Bubbles 80 and 81 have been previously depressed by the operation of solenoids 74 and 75.

Belt 10 is formed of a plastic material such as polypropylene and the bubbles are molded therein. The molded bubbles are bistable, that is, they will remain in the convex or concave position, such as is exemplified by bubbles 77 and 76, until forcibly moved to the other position. Thus the raised pattern on belt 10, exemplified by bubbles 76, 80 and 81, remains on the belt as it passes under the fingers of the operator until these bubbles are pushed to their opposite position by the pressure of wheel 14 on wheel 12 (FIG. 2).

Referring to FIG. 4, there is shown the pattern of bubbles which is impressed on belt 10. Belt 10 has a series of groups of six bubbles 84 which can be used to form any braille character. Braille characters are formed by one or more of the six positions 83 being moved to a raised or convex position. The use of six positions permits all 63 braille characters to be formed. A magnetic track 85 is also formed on belt 10 and includes timing marks 86 at desired positions in the belt to provide a trigger pulse to the logic when the bubble pattern is properly aligned with the solenoid-actuating mechanism as the belt 10 moves past this mechanism. When a trigger pulse is received, the desired solenoids are actuated to set up a character. Clutch 58 (FIG. 1) is energized to advance tape 28, causing a new character to be read and stored in the machine logic. During reading, belt 10 moves continuously to present the braille patterns to the operator.

FIG. 5 shows the pattern on the magnetic tape 28 of FIG. 1. The magnetic tape contains portions 88 which are reserved for note characters, portions 89 reserved for book characters and portions 90 reserved for indexing characters. The book characters 89 are characters which have been placed on the tape during the prerecording of the tape. These characters may be obtained from ink-printing typesetting tapes which have been translated into braille language or manual translations of ink print material. This presupplied information, while designated as book characters, is not necessarily the output of a book, but may be any kind of reading material.

Index characters 90 are supplied so that the operator can find any desired portions of the tape. Preset switches indicate the desired indexing mark and the tape is rapidly searched until an index character corresponding to the switch setting is found. At this point, the tape is stopped automatically and the operator, after returning the machine to the reading mode, is presented with the exact portion of the tape desired.

Note characters 88 are spaces provided on the magnetic tape where notes can be written so that the tape can be annotated as desired by the operator. It should be noted that a tape containing only note characters can be written by the machine operator and can be read by another machine operator.

An enlarged portion of the note characters portion 88 is shown with a series of note characters 93, 94, and 95. This illustrates that an arbitrary number of note character portions may be positioned together on the tape to receive note characters. Each note character portion consists of a bracket pulse section (BP) 97 followed by an identification (ID) bit section 98 and a braille bit pattern section 99. The bracket pulse section 97 alerts the machine to the fact that a new character is being received. The bracker pulse is present in each of the book character sections and index sections also. The identification portion 98 tells the machine what kind of character, that is, note, book or index, follows. The braille bit pattern 99 tells the machine what particular braille character should be imprinted on the belt. This braille bit pattern only occurs with note or book characters and not with an index character.

Book character sections have an arbitrary number of book characters 101, 102, 103 similar to the note character sections. Each book character consists of a bracket pulse section 105, an identification section 106 and a braille bit pattern 107 similar to the sections of the note characters.

Each index character consists of an index bit pattern 109 followed by a bracket pulse 110 followed by an identification bit pattern 111 and a second index bit pattern 112. The extra index bit pattern 109 preceding the bracket pulse permits a greater number of indexing points that would be possible if only a single index bit pattern were used, yet the machine logic used for the note characters or book characters can be used to process the index bit pattern. Operation of the machine in distinguishing between the various characters will be described in a subsequent portion of the specification. While a particular location of the different character portions has been shown in FIG. 5, ii should be noted that any desired intermixture of the book, note and index character portions of the tape may be used as the machine proceeds to the next desired character portion and ignores any in-between characters which are not desired. Book and note character portions are similar in the manner in which they control the machine when the machine is in a reading mode. However, the book character ID bit pattern acts to prevent the machine from stopping at a book character portion when the machine is in a writing mode to prevent destruction of a prerecorded tape.

As show in FIG. 5, a large amount of the control and timing information for the operation of the machine is carried on the tape. This simplifies the control system of the machine, permitting a reduction in its costs and size without a reduction in its capabilities.

Referring to FIG. 6, there is shown the bit pattern which is placed on the tape. Two tape tracks, track A and track B, are used. If a binary 1 is stored on the tape, track A has a 1 and track B has a 0. If a binary 0 is stored on the tape, track A has a 0 and track B has a 1. A 1 is stored on both track A and track B represents a bracket pulse. Blank spaces on the tapes have no pulses. By this means the magnetic tape always has at least one pulse in each recorded position so that it can provide its own clocking pulses for machine operation. Where note character portions are provided on a prerecorded tape, the note character portions have a 0 recorded on the tape so that clock pulses are available.

Referring to FIG. 7, there is shown a block diagram of the data flow and control system logic used with this machine. The motor drive system 115 drives the tape reels 116 and 117 in the manner previously described. Point 118 represents the capstan drive for the magnetic tape 114. Motor drive system 115 also operates belt 120 through drive wheel 121 in the manner previously described. In this drawing, the initials CL represent a connection to control logic 123. These connections have been omitted to provide a clearer drawing.

Assuming that the machine is in the mode of operation to read a prepared tape (read book mode), the operator, by actuating the belt switch 124, sets the machine in operation. Tape 114 is moved past the tape head 126 and the information stored on the tape is read and coupled to tape head switch 127. Since the machine is reading, the information is sent to the read amplifier 128 and amplified thereby. Since at least one pulse is present in each recorded tape position, these pulses are used as a clock signal by data clock 130. The clock signal is coupled to control logic 123 through clock select switch 131. An oscillator 132 provides a clock signal when the machine is in a writing mode and there is no clock signal from the tape 114.

The output of read amplifier 128 is coupled to register 135 and bracket pulse detector 136. Bracket pulse detector 136 detects each bracket pulse and conveys this information to control logic 123 for proper logic control. As data are read from tape 114, they are stepped through register 135 into registers 138 and 139. The timing of the logic and the capacity of registers 138 and 139 is such that the identification bits for the book character 106 of FIG. 5 will be in register 139 and the braille bit pattern 107 of FIG. 5 will be in register 138. At this time in the operation of the machine, character type detector 141 determines that the bit pattern in register 138 is a book character and the information in register 138 is transferred through gate 143 to gate 145. Gate 145 is set to select either register 147 or 148. Each of registers 147 and 148 can hold a number of braille bit patterns and gate 145 is set to a desired register and remains connected to that register until the register is filled. With gate 145 connected to register 147, gate 150 is connected to register 148 to receive the information in register 148. Gates 145 and 150 are always connected to different registers and this operation is controlled by the character register control 151. This logic permits the magnetic tape and the reading belt to operate without requiring synchronization between them as long as the tape is read at a slightly faster rate, when it is in motion, than the belt is imprinted. When the information from the tape fills register 147 and there is information in register 148, the reading of the tape is stopped until register 148 has been cleared by reading out the information therein.

As the information is read out of register 148, the signals are amplified in driver circuit 153 and applied to solenoids 154. Solenoids 154 form the raised characters on belt 120 in the manner previously described according to the braille bit patterns which have been read from tape 114. A magnetic pickup head 156 reads the timing marks on belt 120 to permit operation of the solenoids 154 only when belt 120 is in the proper position for imprinting.

When the operator of the machine desires to read notes which have been placed on tape 114, logic control 123 is placed in he read note mode. The operation of the machine in the read book mode is substantially identical to its operation in the read book mode. In the read book mode, when the identification bits in register 139 indicate that a note character is in register 138, the contents of the register are transferred through gates 143 and 145 to the desired one of registers 147 and 148. In the read note mode book and index characters are ignored.

When it is desired to find a particular index mark, logic control 123 is placed in the index position and index switches 158 are set to the proper position. The output from tape 114 is coupled to registers 135, 138, 139 and register 159. Referring to FIG. 5, it will be noted that the index character pattern includes an additional index bit pattern 109 which precedes the bracket pulse. Thus when register 139 contains the ID bits 111, register 138 contains the index bit patterns 112 and register 159 contains the index bit patterns 109. This provides a substantial increase in the number of index positions which are available. For example, if a six bit index pattern 112 only were used, 63 index positions would be available. By providing the additional index bit pattern 109, the number of index positions available is increased to 4095. By using the coding arrangement shown, the note character and book character portions of the machine can be used to process index bit patterns with only the requirement of an additional register 159. The outputs of registers 138 and 139 are coupled to the index-comparing circuit 161. When the numbers in registers 138 and 159 coincide with the number set on index switches 158, tape 114 is stopped and the index position desired has been reached.

In addition to reading tapes, the machine provides for writing of notes. In the note-writing mode, a standard braille keyboard 162 is provided. Braille keyboards are in current use which have six keys and a space bar to form the desired braille pattern. The hammers which imprint the braille medium are driven by the keys through mechanical linkage. To operate with the machine of this invention, it is only necessary to replace the mechanical linkage with switches operated by the keys. The operator uses the keyboard to provide input information to gate 143. This input information is coupled through gate 145 to one of the registers 147 and 148 in the manner previously described. The output of register 147 or 148 is coupled through gate 150 to belt 120 in the manner previously described. This information is also coupled from gate 150 back to register 138 through gate 164.

In operation in the note-writing mode, tape 114 is moved until the ID bits 98 of FIG. 5 of the next available note character are positioned in register 139. At this point the contents of register 138 are read into the tape through write switch 165. The tape then advances to the next note character and the next character put in through keyboard 162 is read into register 138 and from register 138 to the tape through write switch 165, tape head switch 127 and tape head 126. The prerecorded tape has an 0 pattern in all unused note portions so that clock pulses are available. Control logic 123 in the note-writing mode ignores book and index portions so that these prerecorded portions of the tape cannot be altered or destroyed by the machine operator.

In addition to being able to write notes on a previously prepared tape, the machine permits writing in a blank tape. This tape prepared by the machine can be read by another operator on a different machine. To perform this operation, the machine is operated in a manner similar to that used when notes are written. However, since there is no note identification bit present on the tape, the machine provides its own. With the tape prepared to receive information, the desired character is placed in register 138 in the manner described for operation of the note-writing mode. In addition, note identification bits from note encoder 167 are transferred to register 139 and a bracket pulse is transferred from note encoder 167 to write switch 165. The bracket pulse, note identification bits and note bit pattern are transferred to the tape head 126 in the manner previously described. In this mode of operation, clock pulses are provided by oscillator 132. Another operator desiring to read the tape prepared in this manner places his machine in he read note mode and the operation is as previously described.

The embodiments of the invention in which an exclusive property or privilege is claimed are defined as follows:

1. A machine using raised patterns to convey information, including in combination, an endless reading belt, a magnetic tape having a plurality of different information portions thereon with said tape information portions including pluralities of each character portions, note portions and index portions, with said character portions, said note portions and said index portions being arranged on said tape in a desired sequence, each of said information portions of said tape include a bracket pulse section indicating the beginning of a particular information portion, an identification section for identifying the type of said particular information portion, and an information storage section, tape-reading means, drive means for moving said tape past said tape-reading means to read out the information stored in selected ones of said different information portions, belt-imprinting means, said drive means also acting to move said reading belt past said belt-imprinting means, control means coupled to said drive means, said tape-reading means and said belt-imprinting means, said control means including means for selecting desired ones of said character portions, said note portions, and said index portions, said control means being responsive to said information read out of said selected tape information portion to develop data signals, said belt-imprinting means being responsive to said data signals to form raised patterns on said raising belt, said drive means further including means for removing said raised patterns from said reading belt, input writing means coupled to said control means and generating writing signals representative of desired raised patterns in response to the operation thereof, tape-writing means coupled to said control means and positioned adjacent said tape, said control means further having a writing mode, said control means in said writing mode acting in response to said writing signals to position said note portions of said tape in desired relationship to said tape-writing means, said tape-writing means being responsive to said writing signals to record signals on said tape in said information storage section of said note portion representative of said desired raised patterns.

2. A machine using raised patterns to convey information, including in combination, an endless raising belt, a magnetic tape having a plurality of different information portions thereon, with said tape information portions including pluralities of each character portions, note portions and index portions with said character portions said note portions and said index portions being arranged on said tape in a desired sequence, each of said information portions of said tape including a bracket pulse section indicating the beginning of a particular information portion, an identification section for identifying the type of said particular information portion, and an information storage section, tape-reading means, drive means for moving said tape past said tape-reading means to read out the information stored in selected ones of said different information portions, belt-imprinting means, said drive means also acting to move said reading belt past said belt-imprinting means, control means coupled to said drive means, said tape reading means and said belt-imprinting means, said control means including means for selecting desired ones of said character portions, said note portions and said index portions, said control means being responsive to said information read out of said selected tape information portion to develop data signals, said belt-imprinting means being responsive to said data signals to form raised patterns patterns on said reading belt, and said drive means further including means for removing said raised patterns from said reading belt, input means coupled to said control means and generating writing signals representative of desired raised patterns in response to the operation thereof, tape writing means coupled to said control means and positioned adjacent said tape, said control means further having a writing mode, said control means in said writing mode acting in response to said writing signals to position said note portions of said tape in desired relationship to said tape-writing means, said tape-writing means being responsive to said writing signals to record signals on said tape in said information storage section of said note portion representative of said desired raised patterns, said reading belt being formed of a plastic material with a timing portion positioned along one edge thereof, said timing portion having indexing marks located thereon, a reading head positioned adjacent said belt and coupled to said control means, said reading head being responsive to said indexing marks to develop control signal therefrom, said control means being responsive to said control signals to actuate said belt-imprinting means to cause said raised patterns to be imprinted on said belt in desired locations.

3. A machine using raised patterns to convey braille information, including in combination, a endless plastic reading belt including a plurality of bubbles formed in a desired pattern on said reading belt, each of said bubbles being capable of being in a first position with said bubble extending from one side to said belt and a second position with said bubble extending from the other side of said belt, each of said bubbles being stable in each of said first and second positions, a magnetic tape having a plurality of different information portions thereon with said tape information portions including pluralities of each of character portions, note portions and index portions, with said character portions, said note portions and said index portions being arranged on said tape in a desired sequence each of said information portions of said magnetic tape including a bracket pulse section indicating the beginning of a particular information portion, an identification section for identifying the type of said particular information section, and an information storage section, tape reading means, drive means for moving said tape past said tape reading means to read out the information stored in selected ones of said different information portions, said drive means including a tape takeup reel and a tape supply reel for carrying said magnetic tape, a movable idler arm positioned between said takeup reel and said supply reel and having idler wheels mounted at each end thereof, braking wheels mounted in said idler arm between said idler wheels, a drive wheel mounted between said takeup reel and said supply reel, a resilient drivebelt positioned under tension around said drive wheel, said braking means and said idler wheels in a configuration such that said tension of said resilient drivebelt urges said resilient drivebelt against said magnetic tape on each of said takeup and supply reels, a motor coupled to said drive wheel for turning the same in a direction so that said resilient drive belt drives said tape supply reel in a direction to remove said magnetic tape therefrom and said tape takeup reel in a direction to receive said magnetic tape thereon, said braking means acting to impede the movement of said resilient drive means whereby a first portion of said resilient drivebelt in contact with said magnetic tape on said tape supply reel is under less tension than a second portion of said resilient drivebelt in contact with said magnetic tape on said tape takeup reel, said difference in tension of said first and second portions of said resilient drive means acting to drive said tape takeup reel at a rate slightly faster than said tape supply reel to remove slack from said tape, belt-imprinting means, said drive means also acting to move said reading belt past said belt-imprinting means, control means coupled to said drive means, said tape reading means, and said belt-imprinting means, said control means including means for selecting desired ones of said character portions, said note portions and said index portions, said control means being responsive to said information read out of said selected tape information portion to develop data signals, said belt-imprinting means being responsive to said data signals to form raised patterns on said reading belt, said drive means further including means fir removing said raised patterns on said reading belt, input writing means coupled to said control means and generating writing signals representative to desired raised patterns in response to the operation thereof, tape-writing means coupled to said control means and positioned adjacent said tape, said control means further having a writing mode, said control means in said writing mode acting in response to said writing signals to position said note portion of said tape in desired relationship to said tape writing means, said tape writing means being responsive to said writing signals to record signals on said tape in said information storage section of said note portion representative of said desired raised patterns.

4. A tape drive mechanism, including in combination, a tape takeup reel and a tape supply reel for carrying magnetic tape, a movable idler arm positioned between said takeup reel and said supply reel and having idler wheels mounted at each end thereof, first braking means mounted in said idler arm between said idler wheels, a drive wheel mounted between said takeup reel and said supply reel, a resilient drivebelt positioned under tension around said drive wheel, said first braking means and said idler wheels in a configuration such that said tension of said resilient drivebelt urges said resilient drivebelt against said magnetic tape on each of said takeup and supply reels, a first motor coupled to said drive wheel for turning the same in a direction so that said resilient drivebelt drives said tape supply reel in a direction to remove said magnetic tape therefrom and said takeup reel in a direction to receive said magnetic tape thereon, said first braking means acting to impede the movement of said resilient drivebelt whereby a first portion of said resilient drivebelt in contact with said magnetic tape on said tape supply reel is under less tension than a second portion of said resilient drivebelt in contact with said magnetic tape on said takeup reel, said difference in tension of said first and second portions of said resilient drive belt acting to drive said takeup reel at a rate slightly faster than said tape supply reel to remove slack from said tape.

5. The tape drive mechanism of claim 4 wherein, said resilient drive means is a rubber belt.

6. The drive mechanism of claim 5 further including, a second motor, a capstan, a pinch wheel to force said magnetic tape against said capstan, second braking means coupled to said capstan and clutch means coupling said capstan to said second motor, said second braking means and said clutch means being interconnected so that with said clutch means engaged said second braking means is released and with said clutch means disengaged said second braking means engaged, means coupled to said second braking means and said clutch means for intermittent operation thereof whereby said movement of said magnetic tape is intermittent.

* * * * *

UNITED STATES PATENT OFFICE
CERTIFICATE OF CORRECTION

Patent No. 3,624,772             Dated November 30, 1971

Inventor(s) Arnold P. Grunwald

It is certified that error appears in the above-identified patent and that said Letters Patent are hereby corrected as shown below:

Col. 1, line 69, change "and" to --an--.
Col. 2, line 37, after "supply" insert --and take-up reels so that the tape moves at a constant--.
Col. 3, line 6, change "a" to --an--.
        line 13, change "48" to --49--.
        line 75, after "which" insert --the fingers of the operator rest, is supported by a plate 66, which--.
Col. 5, line 6, change "bracker" to --bracket-- (our error).
        line 23, change "that" to --than--.
        line 30, change "ii" to --it--.
        line 40, change "show" to --shown--.
        line 49, delete "is".
Col. 6, line 45, change "he" to --the--.
        lines 46 and 47, change "book" to --note--.
Col. 7, line 31, change "in" to --on--.
        line 47, change "he" to --the--.
        line 75, change "raising" to --reading--.
Col. 8, line 15, change "raising" to --reading--.
        line 18, after "each" insert --of--.
        line 19, after "portions" (first occurrence), insert a comma.
        line 38, delete "patterns".
        line 40, after "input" insert --writing--.
        line 63, change "a" to --an--.
        line 67, change "to" to --of--.
        line 75, after "sequence" insert a comma.
Col. 9, line 11, change "in" to --on--.
        line 41, change "fir" to --for--.
        line 43, change "to" to --of--.
Col. 10, line 12, change "in" to --on--.
        line 36, after "wheel" insert --positioned--.

Signed and sealed this 13th day of June 1972.

(SEAL)
Attest:

EDWARD M. FLETCHER, JR.          ROBERT GOTTSCHALK
Attesting Officer                  Commissioner of Patents